United States Patent [19]

Herrick

[11] 3,736,866

[45] June 5, 1973

[54] BALE PACKER FORK ADJUSTMENT

[75] Inventor: Frank T. Herrick, Pontiac, Mich.

[73] Assignee: Massey-Ferguson Inc., Detroit, Mich.

[22] Filed: Aug. 16, 1971

[21] Appl. No.: 171,893

[52] U.S. Cl. .................................................100/189
[51] Int. Cl. ..............................................B30b 1/00
[58] Field of Search .......................56/341; 100/142, 100/188 R, 189

[56] References Cited

UNITED STATES PATENTS

| | | | |
|---|---|---|---|
| 2,572,180 | 10/1951 | Morrison | 56/341 |
| 3,156,346 | 11/1964 | McDuffie | 100/142 X |
| 3,464,347 | 9/1969 | Morris | 100/142 X |

Primary Examiner—William I. Price
Assistant Examiner—C. K. Moore
Attorney—Gerhardt, Greenlee & Farris

[57] ABSTRACT

Adjustment mechanism for a baler packer in which a pair of feed-fork assemblies are operated in timed relation to each other for delivery and conveying of crop material into a baler chamber. One of the fork assemblies in the feeder mechanism is adjustable in vertical and longitudinal directions in a plurality of predetermined locations. The adjustment means comprise a plurality of selectively alignable apertures of differing configurations and a connecting pin is provided for insertion through selected ones of aligned apertures at predetermined adjusted positions to thereby prevent inadvertent incorrect repositioning of the fork assembly relative to the drive mechanism and the baling chamber to prevent interference of the fork assembly with the walls of the baling chamber.

6 Claims, 5 Drawing Figures

BALE PACKER FORK ADJUSTMENT

BACKGROUND AND SUMMARY OF THE INVENTION

The present invention relates in general to feeder mechanism and more particularly to an automatic baling mechanism and an improved fail-safe adjusting means for one of the fork assemblies in the baling mechanism.

Conventional automatic balers generally comprise a pick-up assembly which is adapted to lift hay or other crop material from the ground for deposit in a transversely arranged feeder chamber supported on a platform. A baling chamber extends along one end of the feeder chamber in the direction of travel of the baler and which contains a reciprocating plunger adapted to compress the crop material within the baling chamber. The crop is fed into the baling chamber by a feeder mechanism mounted above and partially extending into the feeder chamber to convey the crop material into the baling chamber through a feed opening at one end of the feeder chamber. The crop material is then compressed, in the baling chamber by the reciprocating plunger, into bales which then are automatically tied when the bales are completed.

The feeder mechanism of the baler generally comprises a pair of feed fork assemblies which sweep through the feeder chamber along curvilinear closed paths in timed relationship to each other and to the reciprocation of the plunger in the baling chamber, and which moves the crop material into the baling chamber. The attitude of the feed fork assemblies relative to each other as they move through curvilinear closed paths of travel is controlled by connecting link members, The feed fork assemblies are conjointly oscillated by means of a crank-type or similar type mechanism. The feed fork assembly adjacent the baling chamber distributes the crop material received from the outboard feed fork assembly throughout the baling chamber between each stroke of the plunger. Thereafter, the feed fork assembly is extracted upwardly through the opening in the wall of the baling chamber during a portion of each feed stroke.

In the conventional feeder mechanism, as described above, difficulties are encountered in maintaining proper relationship between the feed fork assemblies relative to each other and to the walls of the feeding and baling chamber for maximum sweep efficiency and without the possibility of interference with each other or with the walls of the chambers. Thus, if the tines of the feed fork assemblies, and particularly the in-board feed fork assembly, are improperly oriented to each other or to the chamber walls, they may cause interference and subsequent damage to the mechanism. Conversely, crop material may become lodged between the tines of the fork assemblies or respectively between the tines and the walls of the chambers. There is a particular tendency of certain crop material to become lodged between the tines of the in-board feed fork assembly and the wall of the baling case as the tines start to move upward through the opening in the top wall of the baling case on the return stroke.

Attempts have been made in prior feeder mechanisms to prevent wedging of material or damage to the tines of the feeder fork assembly due to interference with the wall of the baling chamber by adjusting the tines of the feeder fork assembly adjacent the baling chamber to assume a more vertical attitude during return stroke from the baling chamber. These prior attempts have resulted in poorly formed bales as the result of incorrect repositioning of the tines and may also result in inefficient stripping of the crop material from the tines of the out-board feed fork assembly. As a further result of incorrect adjustment of the tines of the in-board feeder fork assembly, which can cause interference with other moving or stationary parts of the mechanism, there is conventionally provided a shear pin safety release device which causes interruption in the baling operation until the shear pin is replaced and the tines have been readjusted in a correct position.

In view of the foregoing difficulties in prior art-feeder mechanisms and feeder fork adjusting means, the present invention provides an improved feeder fork adjusting arrangement which is constructed such as to make incorrect adjustment of the tines of the feeder fork assembly impossible.

Accordingly, it is the primary object of the present invention to provide improved adjusting means for a feeder fork assembly in a baler mechanism of the herein described type which permits vertical as well as longitudinal adjustment of the tines of the feeder fork assembly in correct predetermined positions, and which is constructed such that the tines of the feeder fork assembly can be adjusted only in certain positions making incorrect adjustment virtually impossible.

It is another object of the present invention to provide improved releasably adjusting means for a feeder fork assembly comprising a connecting pin and a plurality of selectively alignable apertures provided on the feeder fork assembly and the feeder fork support member in which the apertures are of different shape or size and the shank portion of the connecting pin is shaped along its length in correspondence with the different shape or size of the apertures such that certain ones of the differently sized apertures must be aligned to permit insertion of the connecting pin to thereby effectively prevent incorrect repositioning of the tines of the feeder fork assembly.

The foregoing and other objectives and novel features of the invention will become more fully apparent by reference to the following detailed description in conjunction with the appended drawings.

BRIEF DESCRIPTION OF THE DRAWINGS

The accompanying drawings illustrate in several figures a preferred embodiment of the present invention in which.

DETAILED DESCRIPTION OF THE INVENTION

Figure 1:
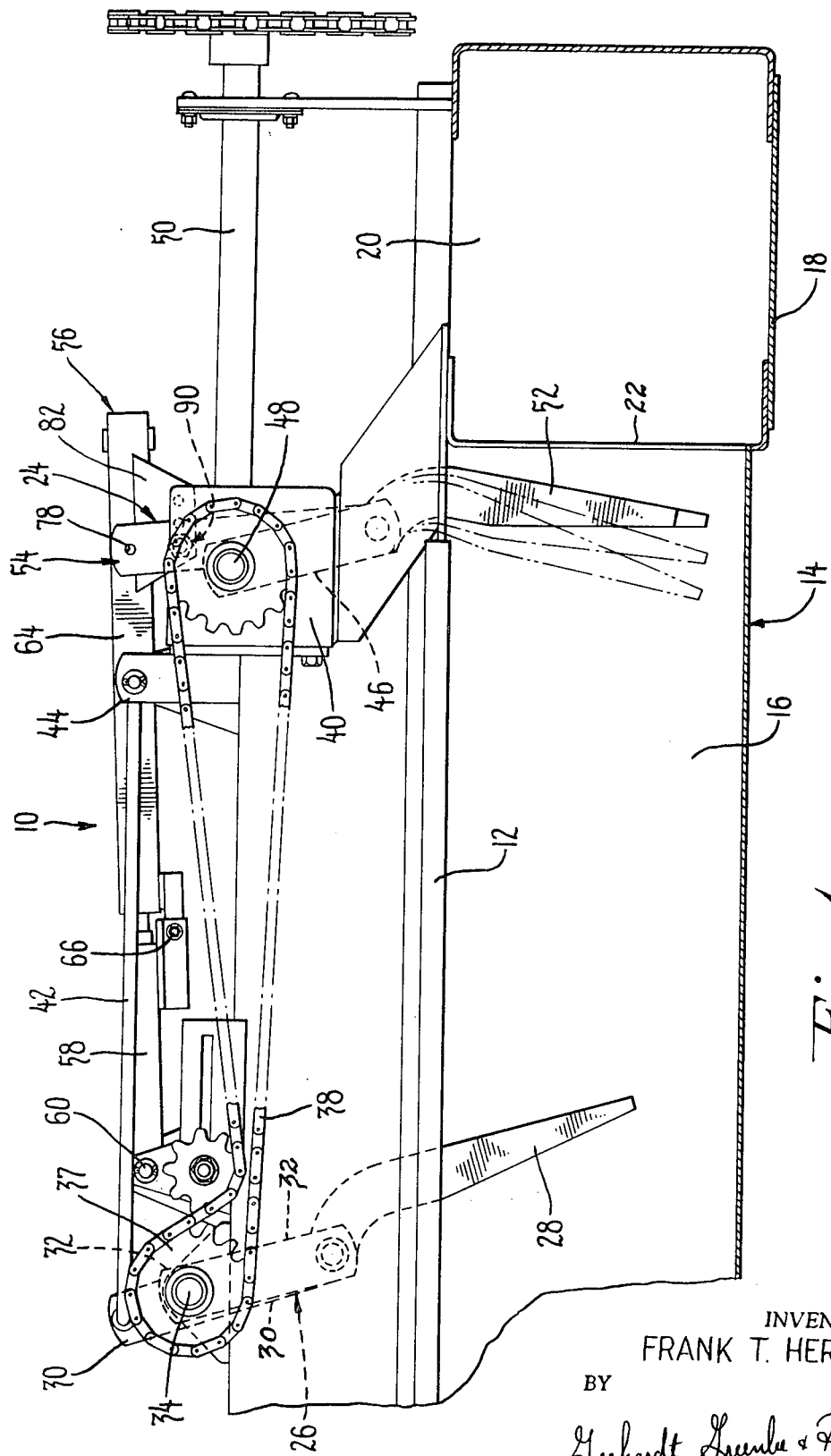
FIG. 1 is a side elevation of the feeder mechanism for an automatic baler, partially shown in cross-section and other portions being broken away for clarity and having the present invention embodied therein in the right hand or in-board feeder fork assembly.
Figure 2:
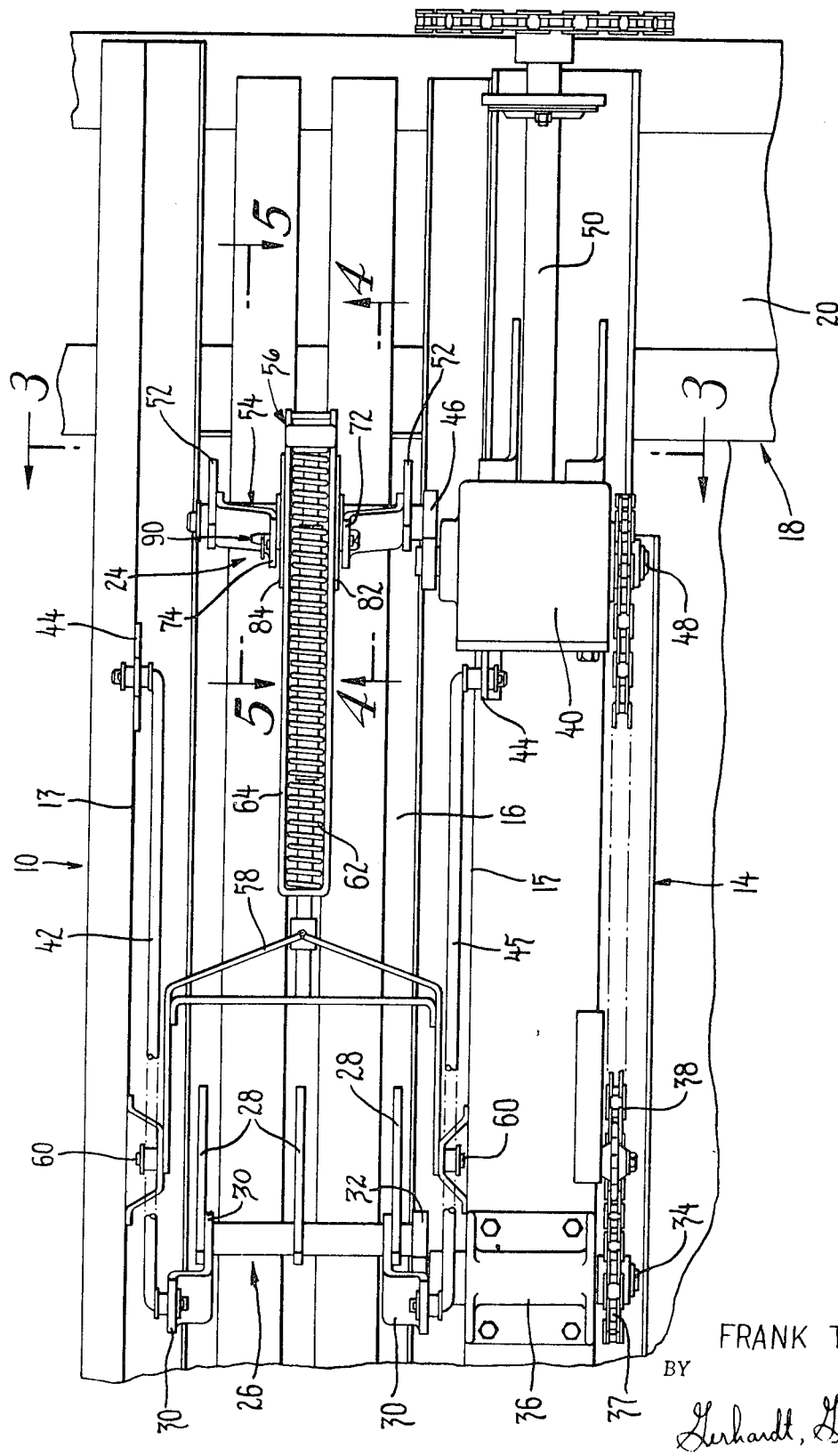
FIG. 2 is a top plan view of the feeder mechanism shown in FIG. 1, portions of which are shown in cross section and other portions being broken off for clarity.

With continuing reference to the attached drawings and as particularly illustrated in FIGS. 1 and 2, there is shown a feeder mechanism, generally indicated by reference numeral 10, of an automatic baler such as a hay baler or the like.

The feeder mechanism 10 is supported on a table or platform 12 of the baler and comprises a longitudinal feed housing 14 disposed in transverse direction of travel of the baler and which defines a longitudinal feed chamber 16 between opposed side walls 13 and 15 of housing 14.

As shown at the right in FIGS. 1 and 2, at one end of the feed housing 14 a baling housing 18 is provided for extension transverse to the longitudinal direction of feeder housing 14 which generally comprises a channel type member defining a baling chamber 20. The baling housing 18 is provided with a side opening and adjoining top opening 22 adjacent the right end of and in alignment with feed chamber 16. Thus, by this arrangement cut crop, hay or the like, can be transferred from the feed chamber 16 (by means of a mechanism hereafter to be described) into the baling chamber 20.

As is commonly known, though not shown in the drawings, the baling chamber 20 is provided with a reciprocating plunger member adapted to compress the stacks of cut crop deposited in the baling chamber against opposing surfaces in the chamber and subsequent ejection from the baling chamber through an outlet (not shown).

Retained within the feed chamber 16 are a pair of longitudinally disposed spaced feed fork assemblies, 24 and 26 respectively. The out-board feed fork assembly 26 defined a crop delivering member provided with a plurality of tines 28 extending downwardly into the feed chamber 16. Upwardly, the tines 28 are connected to a link member 30 which at its lower end is pivotally connected to the lower end of a crank arm 32. The upper end of crank arm 32 is secured to a drive shaft 34 which extends transversely across feed chamber 16 and outwardly thereof through a bearing support 36 at the outside of the frame 14. Crank drive shaft 34 is connected to a pulley or sprocket 37 which in turn is drivingly connected by a chain drive 38 to a gear drive mechanism 40 at the inner end of baler frame 14.

The upper ends of bifurcated link member 30 of outboard feeder fork assembly 26 are each pivotally connected to the ends of a pair of longitudinal guide rods 42 which extend longitudinally towards the baling housing 18 for pivotal securement by means of brackets 44 attached to the housing walls 13 or 15 respectively. Thus, out-board feeder fork assembly 26 is supported for rotation by means of crank 32 and drive shaft 34 for oscillation along a curvilinear path as is customary in feeder mechanisms of this type.

The in-board feeder fork assembly 24 is similarly supported for oscillation at the lower end of a crank arm 46 which is connected to a drive shaft 48 within the drive mechanism 40. As is customary, drive mechanism 40 is drivingly connected by means of in-put drive shaft 50 to a source of driving power (not shown) normally associated with the baler 10.

Similarly, in-board feeder fork assembly 24 comprises a plurality of tines 52 which, at the upper end, are connected to a bifurcated link member 54 which in turn is connected to the crank arm 46 of the drive mechanism 40.

Generally, the upper end of bifurcated link member 54 of inboard feeder fork assembly 24 is pivotally connected to the end of a longitudinal member 56 which extends longitudinally across feed chamber 16 towards the out-board feed fork assembly for pivotal securement by means of a forked bracket 58 to opposite aligned pivot means 60 supported on the upper ends of side walls 13 and 15 respectively.

Conventionally, longitudinal link member 56 comprises a safety release mechanism including a resilient member, such as a spring 62 retained within a longitudinal channel type housing 64 which at its inner end is releasably connected by means of shear pin 66 to the forked bracket 58. Thus, as is customarily known, the in-board feed fork assembly 24, which is adapted to pick up crop material from the out-board feed fork assembly 26 for subsequent movement into baling chamber 20 through chamber opening 22 when oscillated around a defined curvilinear path by means of rotation of crank arm 46, is releasably connected by safety release mechanism comprising longitudinal link member 56 to permit disconnection therefrom upon occurrence of an obstruction in the oscillating path of the fork tines 52, such as wedging of crop material or presence of stones or the like within the material, to prevent damage to the feed fork assembly and drive mechanism of the baler.

Figure 3:
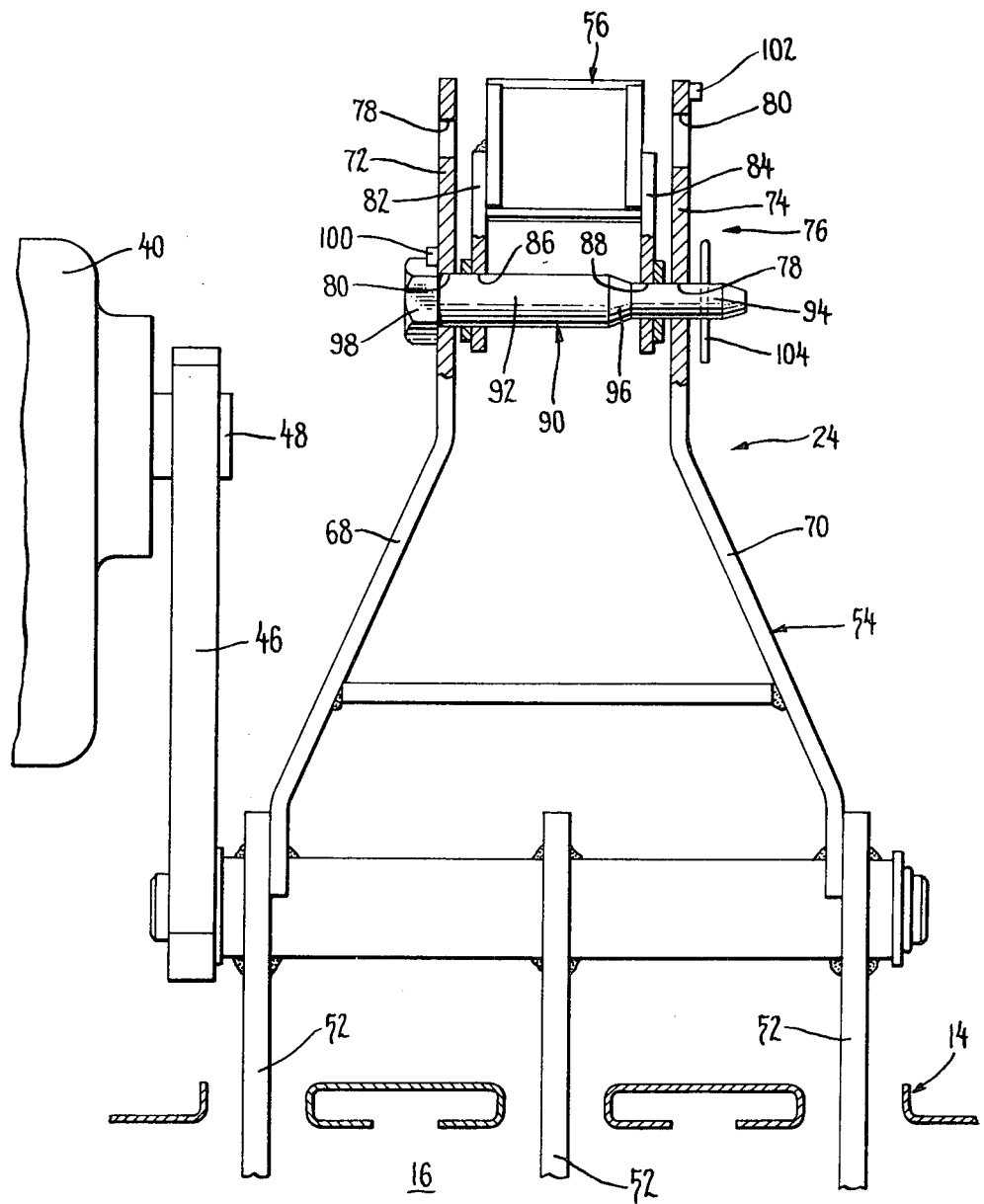
FIG. 3 is an enlarged right hand end view of the feeder mechanism shown in FIGS. 1 and 2 and more particularly illustrating the present improved adjusting mechanism for the in-board feeder fork assembly.
Figure 5:
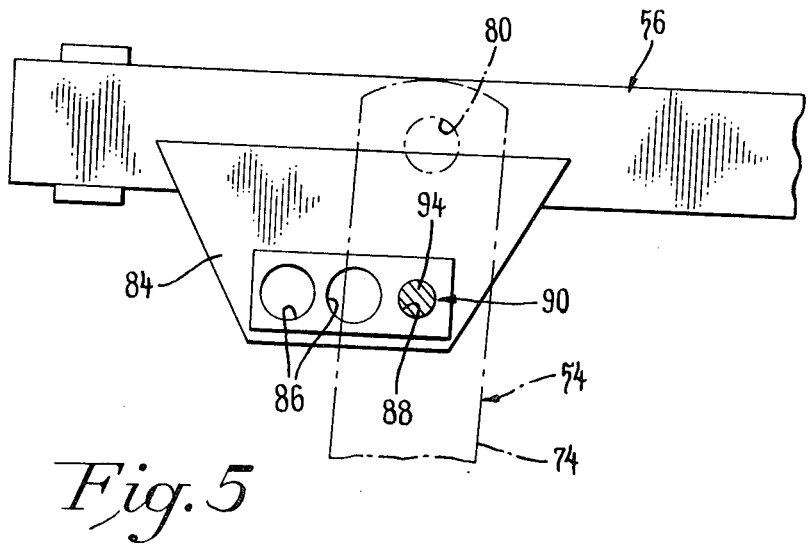
FIG. 5 is a side elevation of the rear or opposite side of the present improved adjusting mechanism both as seen in the direction of the arrows 4—4 and 5—5 respectively in FIG. 2.

With more particular reference to FIGS. 3 or 5, the bifurcated link member 54 of the in-board feed fork assembly 24 is comprised of opposed parallel arms 68 and 70 respectively. The arms 68 and 70 converge toward each other at the upper end to provide opposed parallel side member 72 and 74 respectively which are adapted to receive the channel type spring housing 64 of the longitudinal member 56 for pivotal securement thereto by means of improved adjustable connecting means generally indicated at 76. Thus, the upper ends of opposed side members 72, 74 of bifurcated link member 54 are provided with pairs of vertically spaced aligned apertures 78 and 80 respectively. It will be noted from FIG. 3 that apertures 78 are of considerably smaller diameter than apertures 80, for a purpose to appear. The apertures 78, 80 are arranged along the side members 72, 74 of link member 54 such that a smaller aperture 78 is paired with a larger aperture 80 in opposed axially aligned relationship. Thus, side member 72 is provided with a small aperture 78 and a larger aperture 80 longitudinally spaced therefrom. Similarly, side member 74 is provided with a large aperture 80 oppositely axially aligned with a small aperture 78 in member 72, and with a small aperture 78 similarly positioned in axially aligned relationship with corresponding large aperture 80 in member 72.

The spring housing 64 of longitudinal link member 56 is provided outwardly of both sides with a pair of depending parallel brackets 82 and 84 respectively disposed adjacent the side members 72 and 74.

Figure 4:
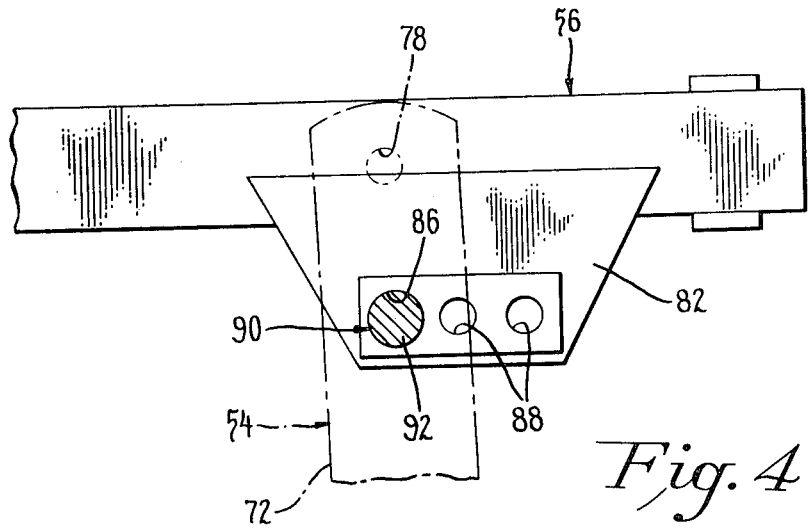
FIG. 4 is a side elevation on an enlarged scale of one side of the present improved feeder fork adjusting mechanism.

As more particularly shown in FIGS. 4 and 5, bracket 82 is provided with a plurality of longitudinally spaced apertures 86 and 88 respectively in which aperture 86 is of larger diameter than adjoining apertures 88 spaced therefrom in longitudinal direction of link member 56.

Similarly, opposite bracket 84 is provided with a plurality of apertures 86 and 88 respectively each of which being oppositely co-axially aligned with a respective aperture in bracket member 82. In opposition to bracket member 82, bracket member 84 provides a pair of large apertures 86, each of which is axially aligned with a small aperture 88 in bracket member 82 and a small aperture 88 is axially aligned with a large aperture 86 in bracket member 82.

Thus, in operational assembly of the device the large and small apertures 86, 88 in brackets 82, 84 of longitudinal member 56 are adapted to be selectively aligned with either a small or a large aperture 78 or 80 in the opposed side members 72, 74 of link member 54 of the in-board feed fork assembly 24 to receive a connecting pin 90 (which is shown in detail in FIG. 3) and which is shaped such as to be receivable only through a pair of opposed axially aligned small and large apertures 78, 80, 86, 88. The shank portion 92 of the connecting pin 90 culminates in a small diameter end-portion 94 and includes a transition area 96. The head 98 of connecting pin 90 may be of polygonal shape to provide flat radial surfaces so that, upon insertion of connecting pin 90, a flat surface of the polygonal head 98 will be engaged by an abutment 100 on the outside of side member 72 or by another abutment, 102 on the outside of side member 74 to thereby prevent rotation of connecting pin 90 after insertion within the respectively aligned apertures in both side members 72, 74 and bracket members 82, 84. The pin 90 is locked against accidental removal by means of a cotter pin 104 or the like.

In the illustrated example in FIGS. 1 and 3, the link member 54 is pivotally attached to the longitudinal member 56 by means of connecting pin 90 inserted through the lower set of aligned small aperture 78 and large aperture 80 in the side flanges 72, 74 of link member 54 and through a corresponding large aperture 86 in bracket 82 and small aperture 88 in bracket 84 of longitudinal member 56 as shown.

Considering the illustrated arrangement being the normal position of in-board feed fork assembly 24, the tines 52 of fork assembly 24 can be repositioned as shown in dotted lines in FIG. 1 in order to clear the edge of the opening 22 in baling housing 18 upon oscillation of fork assembly 24. Thus, the tines 52 of fork assembly 24 in certain instances will have to be adjusted to vary the vertical position of the tines 52 so that, upon return stroke, i.e., counter clockwise in the drawings, the tines will clear the opening 22 without permitting any material to become wedged between the tines and the edge of the opening.

The feed fork assembly 24 can be adjusted in longitudinal direction of the supporting member 56 within the range of predetermined positions of apertures 86, 88 in the bracket members 82, 84 of the longitudinal link member 56. To this effect, after removing connecting pin 90 from the position shown in FIG. 1 and 3, in order to reposition the tines 52 of in-board feed fork assembly 24 to the alternate positions shown in dotted lines in FIG. 1, the pin 90 will have to be reversed end-to-end for insertion through correspondingly aligned apertures 86 in bracket 84 and aperture 88 in bracket 82 as well as correspondingly aligned apertures 80 in side flange 74 and aperture 78 in side flange 72 across the feed fork link member 54 at the upper end thereof causing the tines 52 to be angularly repositioned in positions indicated by dot and dash lines in FIG. 1.

Because of the variations in size of the apertures 78, 80 and 86, 88, any pair of such apertures will have to be aligned in a predetermined fixed position to permit insertion of the shaped connecting pin 90. This arrangement prevents any other mismatched position of adjustment because of the inability of the shaped connecting pin to extend through any other pairs of aligned apertures not matching the shape of the longitudinal configuration of connecting pin 90.

Although the present invention has been described by means of a preferred embodiment, it will be obvious to anyone skilled in the art to which the invention pertains to make various changes and modifications therein without departing from the spirit and essential characteristic of the invention as defined by the scope of the appended claims.

What we claim is:

1. For use in a baler mechanism of the automatic feed type having a frame defining a packing chamber and a baling chamber adjacent one end of the packing chamber; first and second fork assemblies retained within the packing chamber; means drivingly interconnecting said fork assemblies and drive means for conjoined movement of said fork assemblies in predetermined timed relationship characterized by means for adjustably supporting one of said fork assemblies comprising in combination a longitudinal member connected to the frame and to a link attached to one fork assembly, said link extending upwardly from the tines of said one fork assembly for securement to one end of said longitudinal member; a crank arm pivotally attached to said one fork assembly and rotatively connected to the drive means so that upon activation of said drive means said crank arm is rotated to cause oscillation of said one fork assembly along a defined curvilinear path and pivotal movement of said longitudinal member; said link comprising a pair of arms in opposite aligned positions; the outer end of each of said arms being provided with a first set of a plurality of oppositely axially aligned apertures having different configurations; the one end of said longitudinal member being provided at opposite sides with a second set of a plurality of apertures; each pair of opposite apertures of said second set being disposed in axial alignment and each having a different configuration corresponding to the configurations of said first set of apertures; and a connecting pin adapted for simultaneous insertion through selected aligned ones of said first and second set of apertures, said pin being shaped in correspondence with the different configurations of said selected ones of aligned apertures to thereby prevent incorrect repositioning of said one fork assembly relative to said longitudinal member and said frame.

2. The combination as defined in claim 1, characterized in that said first set of apertures in the upper end of the pair of arms of said link are arranged longitudinally along said link and said second set of apertures in the opposite sides of said longitudinal member are arranged in the direction of longitudinal extension of said longitudinal member in correspondence with the direction of the arrangement of said first set of apertures to permit repositioning of said one fork assembly in longitudinal as well as vertical direction.

3. The combination as defined in claim 2, characterized in that selected ones of said first and second set of apertures are of smaller diameter than the remainder of said apertures, said smaller diameter apertures being directly opposed said remainders of said apertures; said connecting pin having a shank portion with at least two discrete portions with different diameters corresponding to the diameter of the apertures in said link to permit insertion of said pin through axially aligned apertures of said first and second set of apertures in accurate predetermined position of said one fork assembly relative to said longitudinal member.

4. The combination as defined in claim 1, characterized in that said longitudinal member includes a shear pin operable to automatically disconnect said one fork assembly from the frame upon the occurrence of an obstruction within the path of movement of said one fork assembly.

5. A feeder mechanism of the character described comprising a driving member moveable in a feeding direction; at least one fork assembly; means connecting said fork assembly to said driving member including first and second force-transmitting elements interconnecting said members; said first element comprising a rotatable crank-connection including a pivot between said fork assembly and the driving member and the second element including an over-load release device spaced from the pivot and adjustably connected to said fork assembly; said first and second elements being normally cooperative to drivingly connect said fork assembly to said driving member for movement of said fork assembly along a predetermined path and the over-load release device being releasable upon an excess feed load imposed on said fork assembly to enable said fork assembly to pivot freely relative to the driving member; characterized in that said over-load release device includes yieldable means retained within a pair of oppositely extending arm portions of a longitudinal member interconnecting said over-load release device; and means adjustably connecting said fork assembly to said over-load release device for angularly positioning said fork assembly in a variety of predetermined positions relative to the driving member and said over-load release device; said adjusting means permitting a repositioning of said fork assembly only within the range of predetermined locations relative to said over-load release device.

6. The mechanism as claimed in claim 5, further characterized by said adjusting means comprising a plurality of apertures provided in said fork assembly and over-load release device and a connecting pin for insertion through selected aligned ones of said apertures to lock said fork assembly to said over-load release device; selected ones of opposed apertures having a configuration different from the configuration of the remainder of said apertures; said connecting pin being shaped longitudinally in correspondence with the different configurations of said apertures to require alignment of said apertures in predetermined relationship in correspondence with the longitudinal shape of said connecting pin to permit insertion of said pin only through correctly aligned ones of said apertures in said fork assembly and said over-load release device.

* * * * *